(12) United States Patent
Lobanov

(10) Patent No.: US 11,220,445 B2
(45) Date of Patent: Jan. 11, 2022

(54) PROCESS AND APPARATUS FOR SIZED NUTRIENT RECOVERY FROM WASTEWATER BY ELUTRIATION

(71) Applicant: Sergey Lobanov, Vancouver (CA)

(72) Inventor: Sergey Lobanov, Vancouver (CA)

(73) Assignee: Sergey Lobanov, Vancouver (CA)

( * ) Notice: Subject to any disclaimer, the term of this patent is extended or adjusted under 35 U.S.C. 154(b) by 62 days.

(21) Appl. No.: 16/832,507

(22) Filed: Mar. 27, 2020

(65) Prior Publication Data

US 2021/0300802 A1    Sep. 30, 2021

(51) Int. Cl.
*C02F 1/52* (2006.01)
*C05B 7/00* (2006.01)
*C02F 101/10* (2006.01)
*C02F 103/20* (2006.01)
*C02F 101/16* (2006.01)

(52) U.S. Cl.
CPC ............. *C02F 1/5254* (2013.01); *C05B 7/00* (2013.01); *C02F 2001/5218* (2013.01); *C02F 2101/105* (2013.01); *C02F 2101/16* (2013.01); *C02F 2103/20* (2013.01); *C02F 2301/024* (2013.01); *C02F 2301/046* (2013.01)

(58) Field of Classification Search
CPC .............. C02F 1/5254; C02F 2030/046; C02F 2101/16; C02F 2101/105; C02F 2001/5218; C02F 2301/024; C02F 2103/20; C05B 7/00
USPC ............. 210/710, 205, 206, 903, 906; 71/25
See application file for complete search history.

(56) References Cited

U.S. PATENT DOCUMENTS

| | | | |
|---|---|---|---|
| 3,869,381 | A | 3/1975 | Graveland |
| 4,389,317 | A | 6/1983 | Trentelman |
| 4,946,653 | A | 8/1990 | Stopp |
| 6,994,782 | B2 | 2/2006 | Bowers |
| 7,005,072 | B2 | 2/2006 | Bowers |
| 7,622,047 | B2 | 11/2009 | Koch |
| 7,922,897 | B2 | 4/2011 | Koch |
| 8,017,019 | B2 | 9/2011 | Becker |

(Continued)

FOREIGN PATENT DOCUMENTS

| | | |
|---|---|---|
| CN | 103935974 A | 7/2014 |
| CN | 104129769 A | 11/2014 |

(Continued)

OTHER PUBLICATIONS

Ghosh, S., Lobanov, S., Lo, V.K. (2019) Impact of supersaturation ratio on phosphorus recovery from synthetic anaerobic digester supernatant through a struvite crystallization fluidized bed reactor. Environmental Technology, 40 (15), 2000-2010.

(Continued)

*Primary Examiner* — Fred Prince
(74) *Attorney, Agent, or Firm* — Casimir Jones S.C.; J. Mitchell Jones

(57) ABSTRACT

Processes and apparatus are provided for recovery of dissolved species from wastewater streams, in the form of precipitates sized by elutriation. The processes may for example be controlled so that the recovered sized solids are in the form of relatively insoluble plant nutrients, such as struvite. The extracted nutrients may for example include solid species of phosphorus, and/or nitrogen, and/or potassium.

21 Claims, 2 Drawing Sheets

(56) References Cited

U.S. PATENT DOCUMENTS

| | | | |
|---|---|---|---|
| 8,992,776 B2* | 3/2015 | Galgon | C02F 3/006 |
| | | | 210/610 |
| 8,999,007 B2 | 4/2015 | Britton | |
| 10,266,433 B2 | 4/2019 | Britton | |
| 2009/0045135 A1* | 2/2009 | Khudenko | C02F 1/004 |
| | | | 210/631 |
| 2012/0003135 A1 | 1/2012 | Vollendorf | |
| 2018/0370830 A1* | 12/2018 | Fitch | B01D 61/145 |

FOREIGN PATENT DOCUMENTS

| | | |
|---|---|---|
| CN | 204298122 U | 4/2015 |
| CN | 106430506 A | 2/2017 |
| CN | 106512465 A | 3/2017 |
| CN | 206255878 U | 6/2017 |
| CN | 107445266 A | 12/2017 |
| CN | 209242807 U | 8/2019 |
| EP | 3112320 A1 | 1/2017 |
| ES | 2455740 | 4/2014 |
| FR | 2962433 | 1/2012 |
| JP | 2576679 B2 | 1/1997 |
| JP | H11267665 A | 10/1999 |
| JP | 3344132 B2 | 11/2002 |
| JP | 3649471 B2 | 5/2005 |
| JP | 3883222 B2 | 2/2007 |
| JP | 505878 B2 | 7/2010 |
| KR | 20170014793 A | 2/2017 |
| WO | 2017194997 | 11/2017 |

OTHER PUBLICATIONS

Ghosh, S., Lobanov, S , Lo, V.K (2019) An overview of technologies to recover phosphorus as struvite from wastewater: advantages and shortcomings. Environmental Science and Pollution Research, 26(19), 19063-19077.

Peng, L., Dai, H., Wu, Y., Peng, Y., Lu, X. (2018) A comprehensive review of phosphorus recovery from wastewater by crystallization processes. Chemosphere, 197, 768-781.

* cited by examiner

PROCESS AND APPARATUS FOR SIZED NUTRIENT RECOVERY FROM WASTEWATER BY ELUTRIATION

FIELD

Innovations are disclosed in the field of aqueous chemistry, including processes and apparatus for removing dissolved species from wastewaters as sized precipitates.

BACKGROUND

Dissolved phosphorus, nitrogen and potassium species are often discharged in wastewaters, particularly wastewaters of agricultural origin. This can have the deleterious effect of facilitating the aquatic growth of algae and other organisms, which in turn can lead to environmentally harmful eutrophication of natural water bodies. The converse component of this nutrient cycle involves the use of metered amounts of phosphorous, nitrogen and potassium species as fertilizers in agriculture. There is accordingly an unmet need for the effective recycling of nutrients from wastewaters to fertilizers.

A number of nutrient recovery technologies based on crystallization processes exist. Some of these technologies extract phosphorus and other nutrients as either struvite, calcium phosphate, or other sparingly soluble compounds in the form of fine crystals or powder. This causes issues with the separation of the recovered product from the wastewater and other suspended solids. Fine materials may be challenging and costly to dewater, dry, and handle. Many of the substances recovered as powders need further processing before they can be used as fertilizers. There accordingly remains a need for alternative processes for recovering valuable materials from wastewaters in a physical form that is convenient subsequent use.

Some sparingly soluble phosphate compounds such as struvite are effective slow-release fertilizers, due to relatively low solubility. This is in contrast to typical water soluble fertilizers, such as mono-ammonium and di-ammonium phosphates, which may only be partially absorbed by crops while a significant portion of such fertilizers may be washed out from the soil into the environment. Struvite dissolves very slowly, thereby ameliorating the loss of nutrients from the soil and providing effective nutrition to plants. The relatively low solubility of such fertilizers also helps to prevent the plant roots from being "burned" by the high salinity that can be caused by more water soluble fertilizers. Since many agricultural, municipal, and industrial wastewater streams contain high amounts of nutrients, particularly phosphorus and nitrogen, struvite has the potential to be recovered from these waste streams.

There are for example a number of processes for phosphorus recovery from waste streams in the form of struvite and other phosphate compounds. Many existing struvite recovery processes extract it in the form of small, powder-like particles that are very hard to dry and separate from impurities, which is a significant drawback for the final fertilizer product. Therefore, there is a need for a process that can produce a high quality struvite fertilizer product in the form of small granules, or pellets, that can be easily separated from the wastewater and other impurities, and can also be easily dried, transported and stored.

SUMMARY

Processes and apparatus are disclosed for recovery of dissolved species from wastewater streams, in the form of sized precipitates. Processes are for example provided for removing a dissolved species from an aqueous inflow stream, the dissolved species comprising a dissolved nitrogen and/or a dissolved phosphorous and/or a dissolved potassium species. These processes may includes steps of segregating the aqueous inflow into streams that are directed into a reactor, with a precipitating agent also being injected into the reactor. The precipitating agent may for example be provided in a distinct material stream, e.g. as a solid or liquid, or the precipitating agent may be present in one or more of the aqueous inflow streams.

The aqueous inflow stream may for example be segregated into a plurality of reactor inflow streams, for example in a manifold in fluid communication with the reaction conduit. The plurality of reactor inflow streams may be directed upwardly into the base of a reaction conduit segment in a reactor vessel so as to create a turbulent upward flow in the reaction conduit.

A precipitating agent may also be injected into the base of the reaction conduit, for example under conditions maintained in the reaction conduit so as to provide a supersaturated concentration of a reaction product of the precipitating agent reacting with the dissolved species. The precipitating agent (e.g. either solid or liquid) may for example be, any one or more of: an alkali (caustic soda, caustic potash, lye, ammonia), a magnesium salt (such as $MgCl_2$, $MgSO_4$, $MgO$, $Mg(OH)_2$), magnesite, brucite, a combustion bottom ash or a fly ash. These reactor conditions may for example be controlled so as to provide a desired saturation index for the reaction product, for example of at least 2 (optionally 2.0-3.0, optionally 2.5), the reaction product forming a solid precipitant species entrained in an upward reaction conduit fluid flow.

The upward reaction conduit fluid flow may then be directed to a contiguous clarifier segment of the reactor. The upward reaction conduit fluid flow rate may for example be maintained between 20-80 cm/min, optionally at approximately 50 cm/min. The clarifier segment of the reactor may for example be dimensioned to reduce the upward flow rate of the upward reaction conduit fluid flow. The clarifier may for example be a frustum shaped clarified, for example where the frustum shaped clarifier comprises sloped walls having a slope angle of from about 45-85°, optionally from about 60-70°.

The upward clarified fluid flow rate may be maintained in the clarifier so as to permit entrained solid precipitant species to descend in the clarifier segment of the reactor and return to the reaction conduit while a clarified discharge fluid flow continues to flow upwardly out of the clarifier segment of the reactor. The upward clarified fluid flow rate may for example be maintained between about 1-5 cm/min, optionally at about 2 cm/min. Conditions may for example be maintained in the reactor for substantial removal of the dissolved species from the aqueous inflow stream to provide the clarified discharge fluid, for example so that removal of dissolved species from the input to the discharge is at least 60%, 70%, 80% or 89%.

Conditions may be maintained in the reactor to permit the progressive agglomeration of the precipitant species, for example so as to form agglomerated granules of a size and density sufficient to cause the agglomerated granules to settle towards the base of the reaction conduit, and it has surprisingly been demonstrated that conditions can be arranged so that this settling takes place in the presence of the turbulent upward reaction conduit fluid flow. The hydraulic retention time in the reaction conduit may for example be maintained between 1-10 min, optionally between 2-5 min.

An upward channeled fluid flow may be injected into the reactor through a channel in fluid communication with the base of the reaction conduit. The channel may for example be dimensioned to permit metering of the upward channeled fluid flow so as to permit agglomerated granules of a selected size and density to descend through the channel, while returning un-selected precipitant species upwardly to the reaction conduit. The upward channeled fluid flow rate may for example be maintained at about 10%, optionally in a range of 5-50%, of the upward reaction conduit fluid flow rate.

The channel may for example be dimensioned to have an average channel cross-sectional area $C_{Xarea}$, while the pellet hopper similarly has an average pellet hopper cross sectional area $PH_{Xarea}$ and the reaction conduit also has an average conduit cross sectional area $RC_{Xarea}$: and those dimensions may be arranged so that $C_{Xarea} < PH_{Xarea}$, and $C_{Xarea} < RC_{Xarea}$. 12.

In this way, a sized solid granule product is segregated by elutriation, and this product accordingly descends through the channel. This sized product may be collected into a contiguous pellet hopper, for example sized to accommodate a settled volume of the sized solid granule product. In select implementations, the process may involve periodically restricting the upward channeled fluid flow in the channel and downwardly releasing the contents of the pellet hopper, to collect the desired solid granule product. The sized solid granule product may for example be collected on a sieve, and may be washed on the sieve, and may then be dried. The sized solid granule product may for example have an average product size, and the average product size may for example be from about 1-2 mm. The granule product may for example have a desired product purity, for example of at least about 60%, 70%, 80%, 90% or 96%.

The desired solid granule product may for example be one or more of: struvite, K-struvite, calcium ammonium phosphate $CaNH_4PO_4$, and/or hydroxyapatite $Ca_5(PO_4)_3(OH)$, brushite $CaHPO_4.2H_2O$, newberyite $MgHPO_4.3H_2O$, and/or magnesium phosphate $Mg_3(PO_4)_2$. In select alternative embodiments, the purity of the desired solid granule product may for example be at least 70%, 75%, 80%, 90% or 95%.

In one aspect, processes may involve recirculating a portion of the clarified fluid flow from the clarifier to the hopper, using this recirculated fluid flow to mediate the upward channeled fluid flow through the channel. An upward hopper fluid flow in the hopper may for example be provided that mediates the upward channeled fluid flow in the channel, and the hopper may be sized so that the upward hopper fluid flow is less than the upward channeled fluid flow.

One aspect of select implementations of the present processes is the ability to cope with inflow streams that have relatively high levels suspended solids. For example, the inflow stream may include up to 1%, 2%, 3%, 4% or 5% by weight suspended solids. In some embodiments, from 50-95% of the suspended solids in the inflow stream pass through the reactor to the clarified discharge fluid flow.

The present processes may be carried out in a reactor with a system of controls, constituting a reactor system operable to remove the dissolved species from the aqueous inflow stream (the dissolved species comprising a dissolved nitrogen and/or a dissolved phosphorous and/or a dissolved potassium species). One or more screens may be positioned in the aqueous inflow stream, before the aqueous inflow stream enters the manifold, and these screens may for example have a smaller mesh than the diameter of injection nozzles positioned inside the reactor.

The reactor system may include the manifold for segregating the aqueous inflow stream into a plurality of reactor inflow streams, and directing the plurality of reactor inflow streams upwardly into the base of the reaction conduit segment in the reactor vessel, for example so as to create a turbulent upward flow in the reaction conduit. An intake pump may for example be located upstream of the manifold, to provide a pressurized aqueous inflow stream. A precipitating agent inlet port may be provided in fluid communication with the base of the reaction conduit, adapted for injecting the precipitating agent into the base of the reaction conduit, for example under the control of reactor system controls adapted to maintain conditions in the reaction conduit so as to provide a supersaturated concentration of the reaction product of the precipitating agent reacting with the dissolved species. The precipitating agent may be dosed in close proximity to injection nozzles that direct the input fluid into the reactor. In this way, a saturation index may be maintained for the reaction product, as described above, for example of at least 2. The reaction product accordingly forms a solid precipitant species entrained in an upward reaction conduit fluid flow.

The clarifier segment of the reactor, upwardly contiguous with the reaction segment, may be dimensioned relative to the reaction segment so as to reduce an upward flow rate of an upward reaction conduit fluid flow directed into the clarifier from the reaction segment, for example under the control of clarifier system controls operable to maintain an upward clarified fluid flow rate in the clarifier so as to permit entrained solid precipitant species to descend in the clarifier segment of the reactor and return to the reaction conduit while a clarified discharge fluid flow continues to flow upwardly out of the clarifier segment of the reactor. A jacket may be provided on the clarifier, configured to collect the clarified discharge fluid flow.

The reactor system controls may be made to be operable to maintain conditions in the reactor to permit the progressive agglomeration of the precipitant species to form agglomerated granules of a size and density sufficient to cause the agglomerated granules to settle towards the base of the reaction conduit in the presence of the turbulent upward reaction conduit fluid flow.

The channel in fluid communication with the base of the reaction conduit may be connected to a channel fluid source to provide an upward channeled fluid flow through the channel into the base of the reaction conduit. The channel may be dimensioned to permit metering of the upward channeled fluid flow so as to permit agglomerated granules of a selected size and density to descend through the channel while returning un-selected precipitant species upwardly to the reaction conduit, thereby segregating a sized solid granule product by elutriation that descends through the channel into a contiguous pellet hopper sized to accommodate a settled volume of sized solid granule product.

Injection nozzles may be provided directing the plurality of reactor inflow streams upwardly into the base of the reaction conduit. The injection nozzles may for example be elevated above the bottom portion of the reaction conduit. There may for example be at least 2, 3, 4, 5 or 6 injection nozzles. The injection nozzles may be generally evenly distributed throughout a cross-sectional area at the base of the reaction conduit, In select embodiments, a superficial upflow velocity may be maintained inside each nozzle of between 5-15 m/s, or about 10 m/s.

DETAILED DESCRIPTION

Figure 1:
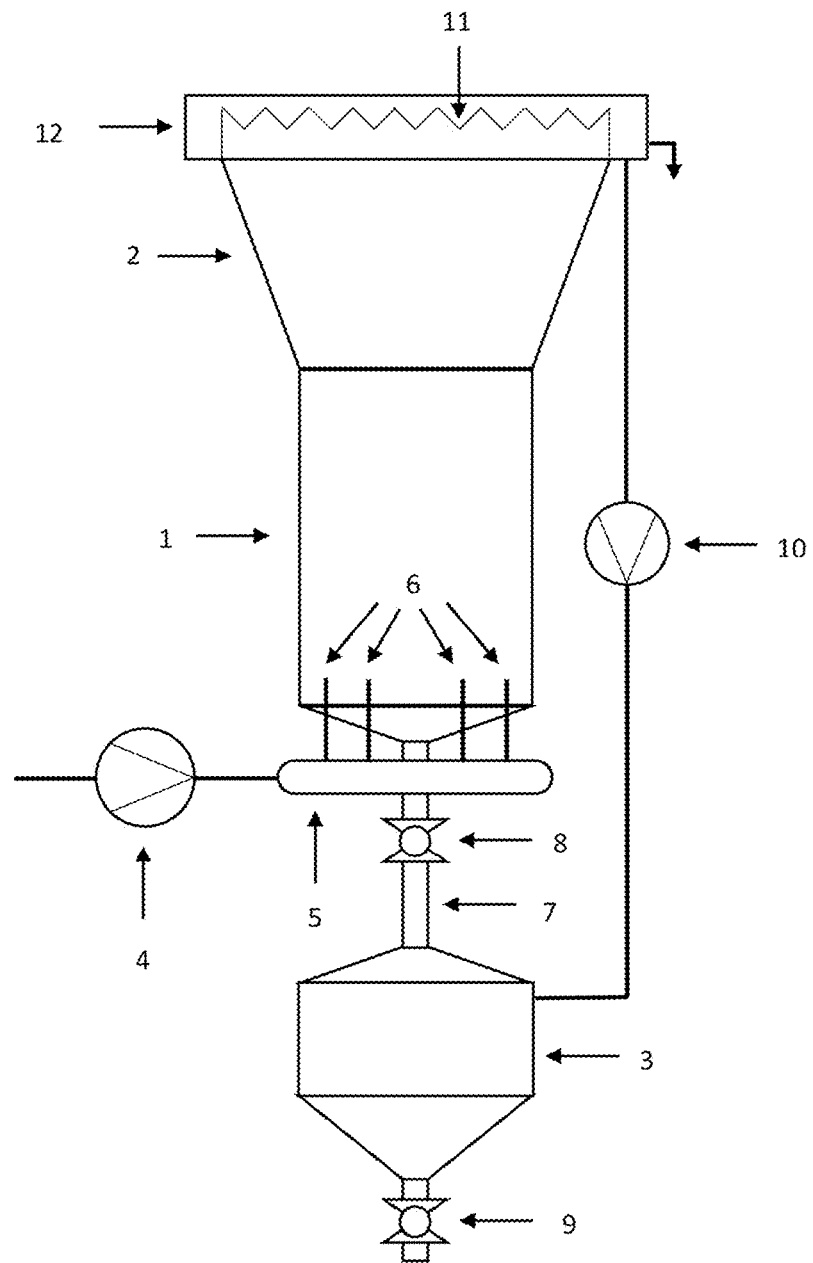
FIG. 1 is a schematic elevational illustration of an apparatus for carrying out processes disclosed herein.

Processes and apparatus are disclosed for recovery of dissolved species from wastewater streams, in the form of precipitates sized by elutriation. In some embodiments, the recovered solids may for example be plant nutrients. The extracted nutrients may for example include solid species of phosphorus (P), and/or nitrogen (N) and/or potassium (K). The processes may be carried out on a wide range of aqueous feeds, for example from wastewater streams of various origins, such as agricultural (manure), municipal (sewage), or other industrial origin.

In select embodiments, the nutrients are extracted through the process of crystallization of phosphate containing sparingly soluble compounds. Such compounds may for example include, but are not limited to, struvite (magnesium ammonium phosphate, MAP), K-struvite (magnesium potassium phosphate, MKP), and other sparingly soluble phosphate compounds. In one aspect of the processes, the nutrients transition from the aqueous liquid (e.g. wastewater) into the solids (e.g. crystals) as a result of creating supersaturation in the wastewater of a reaction product of a precipitant and a dissolved species, i.e. the compound to be extracted from the aqueous inflow stream. Conditions of supersaturation thereby triggering the crystallization process. The supersaturation can be created in a number of ways, including by adding a precipitating agent (or agents) to the wastewater or by mixing together different wastewater streams, where the precipitating agent is provided in one of those streams. The solid materials obtained during the precipitation process may then be separated from the liquid.

Processes disclosed herein provide for nutrient recovery from wastewater in forms in which the extracted compounds may be provided as relatively large spherical granules (pellets). These granules generally represent agglomerates of smaller crystals produced in a crystallization apparatus (reactor). As disclosed here, the chemical and hydrodynamic conditions inside the reactor may be controlled in such a way that the rate of crystal agglomeration is relatively high. This results in the fast growth of the granules and allows for more efficient extraction of nutrients from wastewater. At the same time, it has been demonstrated that the present processes may be controlled so that the granules can be grown large enough to be separated from the wastewater and other suspended solids. In select embodiments, the present processes thereby facilitate recovery of a high purity product from liquid streams, and this may for example be accomplished with inflow streams having relatively high amounts of suspended solids, for example up to 2%, 3%, 4%, 5%, 6%, 7%, 8%, 9%, or 10% by weight, or in an alternative embodiment up to 5% by weight suspended solids. In select embodiments, the relatively high efficiency of the present treatment processes allows for a smaller plant footprint and facilitates economical energy consumption.

In an illustrated embodiment, there are two main components of an apparatus used to implement the present processes: the crystallization reactor and the wastewater injection system. The crystallization reactor, as illustrated, is an upright, fluidized-bed reactor, shown in FIG. 1. The reactor consists of the three main parts: the reaction conduit (1), the clarifier (2), and the pellet hopper (3). The clarifier is contiguous with and directly adjacent to the reaction conduit and is located above it. The cross-sectional area of the clarifier, in the illustrated embodiment, is gradually increasing from the bottom to the top; hence, the clarifier is shaped in the form of a frustum. The cross-sectional profile of the reaction conduit and the clarifier may for example be round, rectangular, or polygonal. The top of the clarifier may be open, and the bottom of the reaction conduit is closed except where various input ports are located. A pellet hopper (3) may be located below the reaction conduit, providing a container for the bulk pellets of the recovered product; it may advantageously taper downwardly so as to facilitate discharge of recovered product at the bottom of the hopper. The top of the pellet hopper is connected to the bottom of the reaction conduit through a vertical pipe or any other channel, which may, as illustrated, have a cross-sectional area substantially smaller than that of the pellet hopper as well as of the reaction conduit.

The presently disclosed apparatus facilitates a particular wastewater injection process. As illustrated, the injection system consists of one or more sets of the following: the pump (4), the manifold (5), and the injection nozzles (6). Each set is available for a separate wastewater stream to be treated in the apparatus. This may be particularly advantageous where distinct wastewater streams should not be mixed with each other before the treatment process. In each set, the pump conveys the wastewater to be treated into the manifold hereby generating elevated pressure inside of it. The manifold (5) may for example be adapted to distribute the wastewater generally equally among the nozzles (6) that are connected to it. The nozzle outlets are located at the bottom or base of the reaction conduit (1). They may be directed substantially upward and slightly elevated above the surface of the bottom of the reaction conduit. The total number of the nozzles from all the injection sets may for example be at least 3; the nozzles may be evenly distributed throughout the cross-sectional area of the reaction conduit at the bottom.

In the illustrated apparatus, the wastewater is injected into the reactor at the bottom of the reaction conduit (1) through the nozzles (6) in such manner that the superficial upflow velocity inside each nozzle is between 5-15 m/s, preferably 10 m/s. This creates a number of jets directed substantially upward; the jets generate highly turbulent flow at the bottom of the reaction conduit. The size (or diameter) of the nozzles depends on their number and the flow rate of the wastewater and can be determined by anyone skilled in the art. The nozzles (6) typically have round cross-sectional area, but may also be rectangular, polygonal, etc. Before entering the manifold, the wastewater stream may pass through an optional screen in order to separate any particulate material that is larger than the size (diameter) of the nozzles in order to prevent possible nozzle plugging.

The reactor as illustrated operates in a continuous upflow mode. While in operation, all parts of the reactor may be filled with the crystals of the compound being extracted from the wastewater; various parts of the reactor contain crystals of different sizes. As described above, the wastewater to be treated is injected into the reaction conduit (1) from the bottom through the injection nozzles (6). At the same time, a precipitating agent (or agents) can be dosed in a close proximity to the injection nozzles (6) at the bottom of the reaction conduit (1) where it is instantly mixed with the wastewater thus creating the chemical condition of supersaturation.

The precipitating agent is typically a substance that decreases the solubility of the extracted substance in wastewater. For example, if the extracted substance is struvite the precipitating agents can be an alkali, a magnesium salt, or any combination thereof. The agent may be injected through one or more inlet ports, installed vertically, horizontally, or at an angle. The precipitating agent can for example be either a liquid or a slurry; it may be continuously dosed in a controlled manner using metering pumps, pH controllers, etc., to maintain a specific level of supersaturation in the reaction conduit with respect to the compound to be extracted from the wastewater. Alternatively, the supersaturation can be created without the addition of the precipitating agent (or agents) but instead by mixing various wastewater streams together by using a separate injection system set for each of the wastewater streams to achieve the desired supersaturation.

In select embodiments, pH values may be controlled in the reactor, for example being maintained to achieve a desired saturation index. Similarly, temperatures in the reactor may be controlled, again with the prospect of setting temperatures in the reactor so as to achieve a desired saturation index. In select embodiments, where struvite is a desired product, reactor pH may for example be controlled to be between 7-10, and a prospective temperature range would for example be 10-40° C., or alternatively up to 60° C.

Supersaturation triggers the formation of crystals inside the reactor and promotes their growth and agglomeration. The crystals remain suspended in the liquid upflow in all sections of the reactor. As the crystals form, the nutrients are extracted from the liquid phase. Conditions may be maintained so that relatively small crystals then settle downwardly in the clarifier (2) and return to the reaction conduit while a clarified wastewater flows out of the top portion of the clarifier, conditions may also be arranged so that suspended solids originally present in the inflow stream also pass out of the top portion of the clarifier. The reactor effluent accordingly contains significantly reduced amounts of nutrients and represents a treated wastewater stream. At the same time, crystals agglomerate inside the reaction conduit (1), which surprisingly is facilitated by the turbulent flow generated by the jets, and thereby form granules, or pellets (which may for example be generally spherical). It has been discovered, as shown in the Examples herein, that conditions may be arranged so that the pellets that have grown to a desired or selected size settle down to the bottom of the reaction conduit (1) and then further down into the pellet hopper (3).

The pellet hopper (3) facilitates continuous separation of the pellets from the agglomerates and the crystals that have not yet achieved the desired size and are therefore not selected to be extracted from the reactor (the "un-selected" precipitants). At the same time, continuous removal of the pellets from the reaction conduit (1) prevents crystal overpopulation at the bottom of the conduit which could have a potentially negative effect on the process.

Separation of the pellets is achieved through the principle of elutriation. As described above, the bottom of the reaction conduit (1) is connected to the top of the pellet hopper (3) through a pipe or a channel (7), which may be a tube with a cross-sectional area smaller than that of both the reaction conduit and the pellet hopper. The cross-sectional area of the channel (7) may for example be round, rectangular, or polygonal. An upflow of a liquid, i.e. an upward channeled fluid flow, is generated in the channel which is opposite to the direction of the pellet settling. The upflow is maintained such that it enables the larger pellets to sink down or be suspended in it, while the smaller pellets and other crystals are carried upwards with the upflow back into the reaction conduit. The larger particles eventually settle down into the pellet hopper (3) where they no longer remain suspended since the hopper has a larger cross-sectional area than that of the channel (7) and hence the upflow velocity is no longer high enough to keep the pellets suspended.

Pellets are periodically discharged from the pellet hopper (3) by isolating it from the reaction conduit using a shutoff valve (8) while simultaneously opening a discharge valve (9) at the bottom of the pellet hopper (3). The pellets can be discharged on a sieve where the liquid along with any suspended solids in it easily drains through the pellets retaining on the sieve. After unloading the pellets from the hopper, the discharge valve (9) is closed, the hopper is filled with the liquid, after which the shutoff valve (8) is opened again so that the next batch of the pellets can be collected. The pellet hopper (3) typically has a large capacity to be able to contain large volume of bulk pellets to avoid the need for frequent discharge. The pellets on the sieve can be washed with water to remove any impurities from their surface and then dried in the air, in an oven at low temperatures, or by any other means known in the art. The fertilizer pellets represent a final product that is ready for the market with no need for any further processing. In select embodiments, the purity of the final fertilizer product may for example be over 50%, 55%, 60%, 65%, 70%, 75%, 80%, 85%, 90% or 95%.

The liquid upflow in the channel (7) that connects the pellet hopper (3) with the reaction conduit (1) may for example be achieved by pumping a portion of the reactor effluent from the clarifier (2) into the pellet hopper using an additional pump (10). Using the reactor effluent has the advantage of keeping the pellets in the mother liquor hereby preventing their dissolution as well as maintaining the volume of the wastewater constant which would otherwise be increased should an additional external liquid be used for that purpose. Control of the upflow velocity in the channel (7) allows for selective separation of a certain pellet size and maintaining the desired crystal size distribution of the harvested pellets. The cross-sectional area and the flow rate through the channel (7) may for example be chosen such that it does not significantly affect the desired hydrodynamic and chemical conditions inside the reaction conduit (1). The flow rate may for example be maintained at about 10% of the total flow rate in the reaction conduit.

In one aspect of the present processes, the process is performed while maintaining a specific, relatively constant level of initial supersaturation with respect to the extracted compound in the reaction conduit (1). This operational parameter is advantageous for controlling the process efficiency. The supersaturation may for example be maintained by means of controlling the flow rate of the precipitating agent (agents). Alternatively, in embodiments where more than one wastewater stream is treated in the apparatus, the supersaturation may for example be maintained by controlling the mixing ratio of the wastewater streams.

Herein, supersaturation of a liquid with respect to a substance is expressed as the saturation index SI, which is the common logarithm of the ratio between the activity product of the ionic species that constitute the substance and the thermodynamic solubility product of the substance. For example, for struvite (magnesium ammonium phosphate, $MgNH_4PO_4 \cdot 6H_2O$), SI would be expressed as:

$$SI = \log_{10} \frac{\{Mg^{2+}\} \cdot \{NH_4^+\} \cdot \{PO_4^{3-}\}}{K_{sp(struvite)}}$$

where: $\{Mg^{2+}\}$, $\{NH_4^+\}$, $\{PO_4^{3-}\}$ are activities respectively of magnesium, ammonium, and orthophosphate ions; and, $K_{sp\ (struvite)}$ is the thermodynamic solubility product of struvite.

The saturation index may be determined by using this formula as part of the control systems of the present processes. Activities of the relevant ionic species can either be measured directly, or derived mathematically from the measured concentrations of the relevant ionic species, by using standard analytical methods. Activity coefficients of the species, as well as solubility product of the extracted compound, will be obtainable from widely available literature sources.

The initial saturation index SI at the bottom of the reaction conduit (1) with respect to the extracted compound may for example be maintained in the range of 2.0-3.0, optionally 2.5. This saturation index along with the highly turbulent flow in the reaction conduit has surprisingly be found to cause a high rate of crystal nucleation. At the same time, it also provides a surprisingly high crystal agglomeration rate, so that the newly formed small crystals can rapidly agglomerate into larger granules (pellets). By establishing and maintaining such conditions where the rate of crystal agglomeration is higher or equal to the rate of crystal formation, the number of small crystals can be reduced, and the number and size of larger agglomerates can be increased. This allows for the control of crystal size distribution and population density within the reactor, and, eventually, for a rapid formation of large granules of the extracted compound. In addition to that, it has been found that the specific hydrodynamic and chemical conditions in the reaction conduit (1) may be selected so as to facilitate the affinity of the crystals to each other rather than to other suspended solids present in the wastewater stream. This has been shown to result in a high purity extracted compound, relatively free of contamination by solid impurities in the wastewater. In select embodiments, the present processes have been found to be capable of treating liquid streams with as high as 2% of total suspended solids without substantially compromising the quality of the recovered fertilizer product.

The implementation of processes having the above saturation index has been found to provide for relatively low residual concentrations of nutrients in the reactor effluent, putatively by allowing the chemical reaction to be substantially completed before the wastewater stream leaves the reactor. In select implementations, once the reaction takes place in the reaction conduit (1), the saturation index rapidly decreases to a level of 0.1-1.0. This may accordingly hinder the formation of new crystals and instead facilitate the growth of the existing ones. This condition may be orchestrated to take place in the upper section of the reaction conduit. In particular, it has been found that conditions may be provided so that large pellets generally settle down to the bottom of the reaction conduit, while some of the much smaller crystals remain suspended throughout its volume. As soon as the crystals grow large enough so that they no longer remain suspended by the upflow, they settle down into the bottom portion of the reaction conduit to be agglomerated into pellets.

In select embodiments, in order to facilitate the settling up of the small and medium-size crystals, the superficial upflow velocity in the reaction conduit (1) may for example be maintained between 20-80 cm/min, or approximately 50 cm/min. Hydraulic retention time in the reaction conduit may for example be maintained between 1-10 min, or between 2-5 min, where these conditions provide sufficient time for the chemical reaction to be substantially completed. The physical dimensions of the reaction conduit (1) may be designed based on these requirements.

Crystals that are too small to remain in the reaction conduit (1), as well as suspended solids originally present in the wastewater, are carried by the upflow into the clarifier (2). In the illustrated embodiment, the clarifier has a gradually increasing cross-sectional area which gradually reduces the upflow velocity of the fluid in it, i.e. the upward clarified fluid flow. As a result, in select embodiments crystals as small as 50 micron can for example be retained inside the reactor without any substantial loss of the extracted compound with the effluent. In order to retain the crystals inside the clarifier (2) the superficial upflow velocity at the top of the clarifier may for example be maintained between 1-5 cm/min, optionally at approximately 2 cm/min. The slope angle of the clarifier frustum in select embodiments may for example be between 45-85°, optionally between 60-70°. The physical dimensions of the clarifier (2) may for example be designed based on these requirements. In the exemplified embodiment, the frustum shape of the clarifier, along with the bulk crystals settling down from the clarifier opposite to the flow, generate minor turbulence at the point of attachment between the clarifier and the reaction conduit (1). This may further serve to promote the growth of the existing crystals in preference to generating new ones. Implementing the foregoing conditions, the clarifier (2) may be made to contain a suspended bed of small crystals. This bed is generally dynamic, as it continuously exchanges crystals with the reaction conduit (1): the crystals that grow large enough settle down, whereas some of the freshly formed fine crystals are carried up with the flow. Consequently, the bed serves as a "filter" that catches the fine crystals and prevents them from escaping the reactor. At the same time, the suspended solids that are originally present in the wastewater stream typically have much smaller size and lower density than the crystals. As a result, they can freely pass through the bed and be carried away from the clarifier by the effluent flow, hereby preventing their accumulation in the clarifier (2). The constant volume of the bed can be controlled by the initial saturation index and the hydrodynamic conditions at the bottom of the reaction conduit. Precise control over the operational parameters prevents the bed from overflowing and losing the fine crystals with the effluent. The top of the clarifier can optionally have an overflow weir (11), as shown in FIG. 1, for uniform distribution of the outflow over a wide surface area to minimize resuspension of settled crystals. The effluent from the reactor will then overflow into an external clarifier (12) designed as a jacket of the reactor clarifier. The jacket (12) can further minimize the loss of the fine crystals with the effluent.

EXAMPLES

Figure 2:
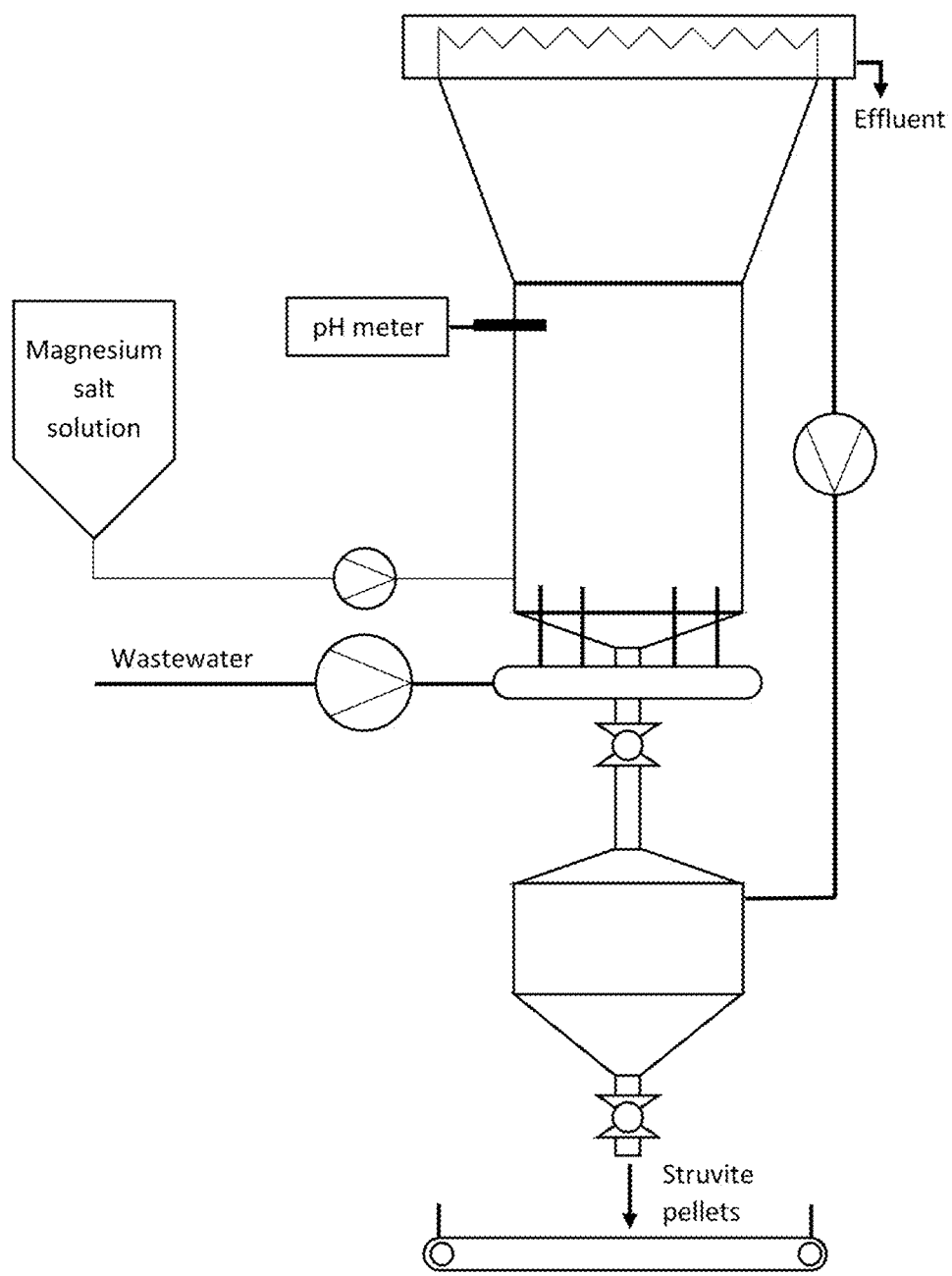
FIG. 2 is a schematic elevational illustration of an alternative apparatus for carrying out processes disclosed herein.

The exemplified process was performed in the apparatus as shown in FIG. 2. The wastewater stream to be treated was an anaerobically digested chicken manure which had undergone a solid separation process. The wastewater had the following characteristics, on average: total suspended solids—2.0%; pH—8.4; conductivity—18 mS/cm; alkalinity—30,000 mg/L as $CaCO_3$; soluble orthophosphate P—$PO_4$—205 mg/L, soluble ammonia nitrogen N—$NH_3$—5050 mg/L, soluble magnesium Mg—5 mg/L, soluble calcium Ca—50 mg/L. The wastewater was continuously pumped from a storage tank into the manifold by a pump at the average flow rate of 200 m³/day. Before entering the manifold, the wastewater passes through a screen with 5 mm openings. The differential pressure in the manifold is maintained at 0.1 MPa. The manifold distributes the wastewater between 4 identical round nozzles. The superficial upflow velocity inside each nozzle was maintained at 9 m/s.

The wastewater enters a cylindrical reaction conduit where it is instantly mixed with a precipitating agent which is dosed at the bottom of the reaction conduit. The precipitating agent is a concentrated solution of a water-soluble magnesium salt. The salt solution is continuously dosed by a metering pump in a controlled manner that provides the molar ratio between soluble magnesium and soluble orthophosphate in the reaction conduit of about 1. Once the agent is mixed with the wastewater the reaction between magnesium, ammonia and orthophosphate takes place essentially immediately and crystals of struvite form in the reaction conduit. The initial saturation index of struvite in the reaction conduit is about 2.3. The superficial upflow velocity in the reaction conduit was 47 cm/min. The pH value at the top of the reaction conduit was monitored by a pH meter which indicated a value of around 8.3. The superficial upflow velocity at the top of the clarifier was 5 cm/min. The clarifier had an overflow weir and a jacket. The treated wastewater (effluent) overflows into the jacket and leaves the reactor through a port installed in the jacket.

The effluent had the following concentrations, on average: soluble orthophosphate P—PO$_4$—22 mg/L, soluble ammonia nitrogen N—NH$_3$—4800 mg/L, soluble magnesium Mg—14 mg/L, soluble calcium Ca—48 mg/L. The removal efficiency of the soluble orthophosphate was accordingly 89%. A portion of the effluent from the jacket is pumped by the additional pump into the pellet hopper at the flow rate of 23 m³/day. The pellets of struvite formed in the reaction conduit continuously settle down into the pellet hopper through a vertical pipe. The superficial upflow velocity in the pipe was maintained at 415 cm/min. This upflow velocity enabled the separation of the struvite pellets larger than 1 mm in size from the rest of the crystals in the reaction conduit. The pellets were drained from the pellet hopper once every 2 days by closing the shutoff valve between the reaction conduit and the pellet hopper and opening the discharge valve at the bottom of the pellet hopper. The pellets along with the liquid were discharged into a container with a sieve at its bottom. The sieve opening size was 0.5 mm. The liquid drained through the sieve while the struvite pellets remained on it. The pellets were then rinsed with clean water and dried in the open air. The weight of dry struvite crystals extracted with each harvest was about 500 kg. The struvite pellet size ranged between 1-2 mm. The purity of the struvite product is about 96%.

REFERENCES

Ghosh, S., Lobanov, S., Lo, V. K. (2019) Impact of supersaturation ratio on phosphorus recovery from synthetic anaerobic digester supernatant through a struvite crystallization fluidized bed reactor. Environmental Technology, 40(15), 2000-2010.

Ghosh, S., Lobanov, S., Lo, V. K. (2019) An overview of technologies to recover phosphorus as struvite from wastewater: advantages and shortcomings. Environmental Science and Pollution Research, 26(19), 19063-19077.

Peng, L., Dai, H., Wu, Y., Peng, Y., Lu, X. (2018) A comprehensive review of phosphorus recovery from wastewater by crystallization processes. Chemosphere, 197, 768-781.

U.S. Ser. No. 10/266,433 (2019)
U.S. Pat. No. 8,999,007 (2015)
U.S. Pat. No. 7,922,897 (2011)
U.S. Pat. No. 7,622,047 (2009)
U.S. Pat. No. 7,005,072 (2006)
U.S. Pat. No. 6,994,782 (2006)
US2012003135 (2012)
U.S. Pat. No. 4,389,317 (1983)
U.S. Pat. No. 3,869,381 (1975)
FR2962433 (2012)
U.S. Pat. No. 8,017,019 (2011)
CN209242807U (2019)
CN107445266A (2017)
CN106512465A (2017)
CN106430506A (2017)
CN206255878U (2017)
CN204298122U (2015)
CN104129769A (2014)
CN103935974A (2014)
WO2017194997 (2017)
KR20170014793A (2017)
EP3112320A1 (2017)
ES2455740 (2014)
JP4505878B2 (2010)
JP3883222B2 (2007)
JP3649471 B2 (2005)
JP3344132B2 (2002)
JPH11267665A (1999)
JP2576679B2 (1997)
U.S. Pat. No. 4,946,653 (1990)

Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. The invention includes all embodiments and variations substantially as hereinbefore described and with reference to the examples and drawings.

The invention claimed is:

1. A process for removing a dissolved species from an aqueous inflow stream, the dissolved species comprising a dissolved nitrogen and/or a dissolved phosphorous and/or a dissolved potassium species, the process comprising:
segregating the aqueous inflow stream into a plurality of reactor inflow streams, and directing the plurality of reactor inflow streams upwardly into a base of a reaction conduit segment in a reactor vessel so as to create a turbulent upward flow in the reaction conduit segment;
injecting a precipitating agent into the base of the reaction conduit segment under conditions maintained in the reaction conduit segment so as to provide a supersaturated concentration of a reaction product of the precipitating agent reacting with the dissolved species, providing a saturation index of at least 2 for the reaction product, the reaction product forming a solid precipitant species entrained in an upward reaction conduit fluid flow;
directing the upward reaction conduit fluid flow to a contiguous clarifier segment of the reactor vessel, the clarifier segment of the reactor vessel being dimensioned to reduce the upward flow rate of the upward reaction conduit fluid flow, and maintaining an upward clarified fluid flow rate in the clarifier segment so as to permit entrained solid precipitant species to descend in the clarifier segment of the reactor vessel and return to the reaction conduit segment while a clarified discharge fluid flow continues to flow upwardly out of the clarifier segment of the reactor vessel;
maintaining conditions in the reactor vessel to permit the progressive agglomeration of the precipitant species to form agglomerated granules of a size and density sufficient to cause the agglomerated granules to settle towards the base of the reaction conduit segment in the presence of the turbulent upward reaction conduit fluid flow;
injecting an upward channeled fluid flow through a channel in fluid communication with the base of the reaction conduit segment, the channel being dimensioned to permit metering of the upward channeled fluid flow so as to permit agglomerated granules of a selected size and density to descend through the channel while returning un-selected precipitant species upwardly to the reaction conduit segment, thereby segregating a sized solid granule product by elutriation that descends through the channel into a contiguous pellet hopper sized to accommodate a settled volume of the sized solid granule product.

2. The process of claim 1, further comprising periodically restricting the upward channeled fluid flow in the channel and downwardly releasing the contents of the hopper, to collect the solid granule product.

3. The process of claim 2, further comprising recirculating a portion of the clarified fluid flow from the clarifier segment to the hopper to mediate the upward channeled fluid flow through the channel.

4. The process of claim 3, further comprising providing an upward hopper fluid flow in the hopper that mediates the upward channeled fluid flow in the channel, and sizing the hopper so that the upward hopper fluid flow is less than the upward channeled fluid flow.

5. The process of claim 4, further comprising segregating the aqueous inflow stream into the plurality of reactor inflow streams in a manifold in fluid communication with the reaction conduit segment.

6. The process of claim 5, wherein the precipitating agent comprises an alkali, a magnesium salt, $MgCl_2$, $MgSO_4$, MgO, $Mg(OH)_2$, magnesite, brucite, a combustion bottom ash or a fly ash.

7. The process of claim 6, wherein the solid granule product comprises one or more of: struvite, K-struvite, calcium ammonium phosphate $CaNH_4PO_4$, and/or hydroxyapatite $Ca_5(PO_4)_3(OH)$, brushite $CaHPO_4.2H_2O$, newberyite $MgHPO_4.3H_2O$, and/or magnesium phosphate $Mg_3(PO_4)_2$.

8. The process of claim 7, wherein the inflow stream comprises up to 5% by weight suspended solids, and wherein 50-95% of the suspended solids in the inflow stream pass through the reactor vessel to the clarified discharge fluid flow.

9. The process of claim 8, wherein the channel has an average channel cross-sectional area $C_{xarea}$, the pellet hopper has an average pellet hopper cross sectional area $PH_{xarea}$ and the reaction conduit segment has an average conduit cross sectional area $RC_{xarea}$, wherein $C_{xarea} < PH_{xarea}$, and $C_{xarea} < RC_{Xarea}$.

10. The process of claim 9, further comprising collecting the sized solid granule product on a sieve; and further washing and drying the sized solid granule product on the sieve.

11. The process of claim 10, wherein the purity of the solid granule product is at least 90%.

12. The process of claim 11, wherein the upward channeled fluid flow rate is maintained in a range of 5-50% of the upward reaction conduit fluid flow rate.

13. The process of claim 12, wherein the initial saturation index SI at the base of the reaction conduit segment for the reaction product is maintained in the range of 2.0-3.0.

14. The process of claim 13, wherein the upward reaction conduit fluid flow rate is maintained between 20-80 cm/min.

15. The process of claim 14, wherein a hydraulic retention time in the reaction conduit segment is maintained between 1-10 min.

16. The process of claim 15, wherein the upward clarified fluid flow rate is maintained between about 1-5 cm/min.

17. The process of claim 16, wherein the clarifier segment is a frustum shaped clarifier, where the frustum shaped clarifier comprises sloped walls having a slope angle of from about 45-85°.

18. The process of claim 17, wherein the removal of one or more of the dissolved species from the aqueous inflow stream to provide the clarified discharge fluid flow is at least 60%.

19. The process of claim 18, wherein sized solid granule product has an average product size, and the average product size is from about 1-2 mm.

20. The process of claim 19, wherein the sized solid granule product has a product purity of at least about 80%.

21. A reactor system operable to remove a dissolved species from an aqueous inflow stream, the dissolved species comprising a dissolved nitrogen and/or a dissolved phosphorous and/or a dissolved potassium species, the reactor system comprising:
a manifold segregating an aqueous inflow stream into a plurality of reactor inflow streams, and directing the plurality of reactor inflow streams upwardly into a base of a reaction conduit segment in a reactor vessel in fluid communication with the manifold, so as to create a turbulent upward flow in the reaction conduit segment;
an intake pump upstream of the manifold to provide a pressurized aqueous inflow stream;

injection nozzles directing the plurality of reactor inflow streams upwardly into the base of the reaction conduit segment; wherein the injection nozzles are elevated above a bottom portion of the reaction conduit segment; wherein a superficial upflow velocity is provided inside each nozzle of between 5-15 m/s;

a screen positioned in the aqueous inflow stream before the aqueous inflow stream enters the manifold; wherein the screen has a smaller mesh than the diameter of the injection nozzles;

a precipitating agent inlet port in fluid communication with the base of the reaction conduit segment, adapted for injecting a precipitating agent into the base of the reaction conduit segment under control of reactor system controls adapted to maintain conditions in the reaction conduit segment so as to provide a supersaturated concentration of a reaction product of the precipitating agent reacting with the dissolved species, providing a saturation index of at least 2 for the reaction product, the reaction product forming a solid precipitant species entrained in an upward reaction conduit fluid flow;

a clarifier segment of the reactor vessel, upwardly contiguous with the reaction conduit segment, the clarifier segment of the reactor vessel being dimensioned relative to the reaction segment so as to reduce an upward flow rate of an upward reaction conduit fluid flow directed into the clarifier segment from the reaction conduit segment, under the control of clarifier system controls operable to maintain an upward clarified fluid flow rate in the clarifier segment so as to permit entrained solid precipitant species to descend in the clarifier segment of the reactor vessel and return to the reaction conduit segment while a clarified discharge fluid flow continues to flow upwardly out of the clarifier segment of the reactor vessel;

a jacket on the clarifier segment configured to collect the clarified discharge fluid flow;

wherein the reactor system controls are operable to maintain conditions in the reactor vessel to permit progressive agglomeration of the precipitant species to form agglomerated granules of a size and density sufficient to cause the agglomerated granules to settle towards the base of the reaction conduit segment in the presence of turbulent upward reaction conduit fluid flow; and, a channel in fluid communication with the base of the reaction conduit segment having a channel fluid source to provide an upward channeled fluid flow through the channel into the base of the reaction conduit segment, the channel being dimensioned to permit metering of the upward channeled fluid flow so as to permit agglomerated granules of a selected size and density to descend through the channel while returning un-selected precipitant species upwardly to the reaction conduit segment, thereby segregating a sized solid granule product by elutriation that descends through the channel into a contiguous pellet hopper sized to accommodate a settled volume of sized solid granule product.

* * * * *